US008824296B2

(12) United States Patent
Ungureanu

(10) Patent No.: US 8,824,296 B2
(45) Date of Patent: Sep. 2, 2014

(54) HANDLING CONGESTION IN A QUEUE WITHOUT DISCARDING NEW MESSAGES RECEIVED FROM A MESSAGE SENDER

(75) Inventor: Radu Ungureanu, Coquitlam (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/411,431

(22) Filed: Mar. 2, 2012

(65) Prior Publication Data

US 2013/0148504 A1    Jun. 13, 2013

Related U.S. Application Data

(60) Provisional application No. 61/570,221, filed on Dec. 13, 2011.

(51) Int. Cl.
*H04L 12/26* (2006.01)

(52) U.S. Cl.
USPC .......................................................... 370/235

(58) Field of Classification Search
CPC ........... H04L 51/22; H04L 28/06; H04L 4/12; H04L 8/26
USPC ............................ 370/254–350; 709/201–213
See application file for complete search history.

(56) References Cited

U.S. PATENT DOCUMENTS

| 7,864,791 | B2 * | 1/2011 | Tatar et al. ..................... 370/419 |
| 8,244,218 | B2 * | 8/2012 | Lorello et al. ............. 455/412.1 |
| 8,572,279 | B2 * | 10/2013 | Payne et al. ................... 709/236 |
| 2008/0031258 | A1 | 2/2008 | Acharya et al. |
| 2010/0008377 | A1 | 1/2010 | Hasti et al. |
| 2011/0176418 | A1 | 7/2011 | Gershinsky et al. |

FOREIGN PATENT DOCUMENTS

EP          1398957 A2       3/2004

OTHER PUBLICATIONS

EP Search Report, Telefonakiebolaget L M Ericsson AB (Pub), 12/194297.3-1862, Mar. 14, 2013.

* cited by examiner

*Primary Examiner* — Ayaz Sheikh
*Assistant Examiner* — Debebe Asefa
(74) *Attorney, Agent, or Firm* — Blakely Sokoloff Taylor Zafman LLP

(57) ABSTRACT

A method, in an element having a queue used to store messages sent from a message sender to a message receiver, of handling congestion in the queue, without discarding a new message from the message sender. The new message which is to be added to the queue is received. The new message is of a given message type. It is determined that congestion handling is to be performed. The congestion handling is performed by removing older messages, of the given message type, from the queue. The new message is added to the queue. Other methods, apparatus, and network elements are also disclosed.

18 Claims, 10 Drawing Sheets

HANDLING CONGESTION IN A QUEUE WITHOUT DISCARDING NEW MESSAGES RECEIVED FROM A MESSAGE SENDER

RELATED APPLICATIONS

This application claims the benefit of U.S. Provisional Application No. 61/570,221, filed Dec. 13, 2011, which is hereby incorporated by reference.

BACKGROUND

1. Field

Embodiments of the invention relate to the field of queues used to store messages; more specifically, to handling congestion in queues used to store messages.

2. Background Information

It is common to store messages that are sent from a message sender to a message receiver in a queue. The newer messages sent by the message sender may be stored or enqueued in the queue, and older messages may be dequeued and provided to the message receiver. The queue may represent a linear or First-In-First-Out (FIFO) structure in which the messages in the queue are kept generally in order. In a FIFO queue, when a given message is added to the queue, all messages previously added to the queue before the given message are removed from the queue before the given message is removed from the queue, whereas all messages added to the queue after the given message are removed from the queue after the given message is removed from the queue. One advantage of such a queue is that it may help to implement an asynchronous communication interface between the message sender and the message receiver. The message receiver does not need to receive or process messages when they are sent by the message sender. Rather, the queue may store the messages sent until the messages are dequeued by the message receiver (e.g., when the message receiver is ready to handle them).

Congestion may tend to occur when more messages are added to the queue than are removed from the queue over a given period of time. The congestion may occur for various reasons, such as, for example, the message sender sending a flood of messages, or the message receiver failing to dequeue messages at an appropriate rate. One way to handle such congestion is to drop or discard the new messages received by the queue from the message sender, which are to be stored in the queue.

SUMMARY

In one aspect, a method performed in an element having a queue that is used to store messages sent from a message sender to a message receiver is disclosed. The method is for handling congestion in the queue, without discarding a new message received from the message sender. The method includes receiving the new message, of a given message type, which is to be added to the queue. It is determined that congestion handling is to be performed. The congestion handling is performed by removing older messages, of the given message type, from the queue. The new message is added to the queue. Advantageously, the congestion in the queue is handled without discarding the new message and without losing its information content.

In another aspect, a congestion handler system is disclosed. The congestion handler system is operable to be deployed in an element having a queue to store messages sent from a message sender to a message receiver. The congestion handler system is operable to handle congestion in the queue, without discarding a new message from the message sender. The congestion handler system includes a congestion handling initiation module. The congestion handling initiation module is operable to receive an indication that the new message of a given message type is to be added to the queue. The congestion handling initiation module is operable to determine whether congestion handling is to be performed. The congestion handler system also includes a congestion handler module in communication with the congestion handling initiation module. The congestion handler module is operable to be initiated in response to the congestion handling initiation module determining that the congestion handling is to be performed. The congestion handler module includes an older message removal module. The older message removal module is operable to remove older messages, of the given message type, from the queue. Advantageously, the congestion handler system is operable to handle congestion in the queue without discarding the new message and without losing its information content.

In yet another aspect, a network element is disclosed. The network element is operable to handle congestion due in part to a number of state indication messages being exchanged within the network element without discarding a new state indication message. The network element includes a line card, a control card, and a queue coupled with the line card and the control card. The queue is operable to store state indication messages sent from the line card to the control card. The network element also includes a congestion handler system that is operable to handle the congestion in the queue without discarding the new state indication message sent from the line card. The new state indication message is operable to indicate a state associated with the line card. The congestion handler system includes a congestion handling initiation module that is operable to determine whether the congestion handling is to be performed. The congestion handler system also includes a congestion handler module in communication with the congestion handling initiation module. The congestion handler module is operable to be initiated to perform the congestion handling in response to the congestion handling initiation module determining that the congestion handling is to be performed. The congestion handler module including a message removal module that is operable to remove the number of state indication messages from the queue. The number of state indication messages were in the queue prior to the new state indication message. Advantageously, the network element is operable to handle the congestion in the queue without discarding the new state indication message.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

As mentioned in the background section, one way to handle congestion in a queue is to drop or discard newly received messages from the message sender that are to be stored in the queue. However, one drawback with dropping the newly received messages is that the information content of the dropped or discarded messages is generally lost. For some types of messages, the newly received message may contain updated (e.g., up-to-date or at least more up-to-date information) that is more updated than less-updated, stale, or outdated information in older messages that are already stored in the queue. As an example, this may be the case for state indication messages, which when sent from the message sender indicate a current/present state of the message sender or a component thereof. Older state indication messages already stored in the queue may contain outdated or obsolete state indication information that is outdated and less relevant and/or less useful than the updated state indication information in a newly received message. The state indication information in the older messages may be rendered outdated or obsolete by the state indication information in the newly received message, which when sent may indicate a current/present state. As such, dropping or discarding the newly received messages, as part of handling congestion, may sacrifice relatively more updated, relevant, and useful information in favor of retaining outdated or obsolete information present in the older messages retained in the queue.

Figure 1:
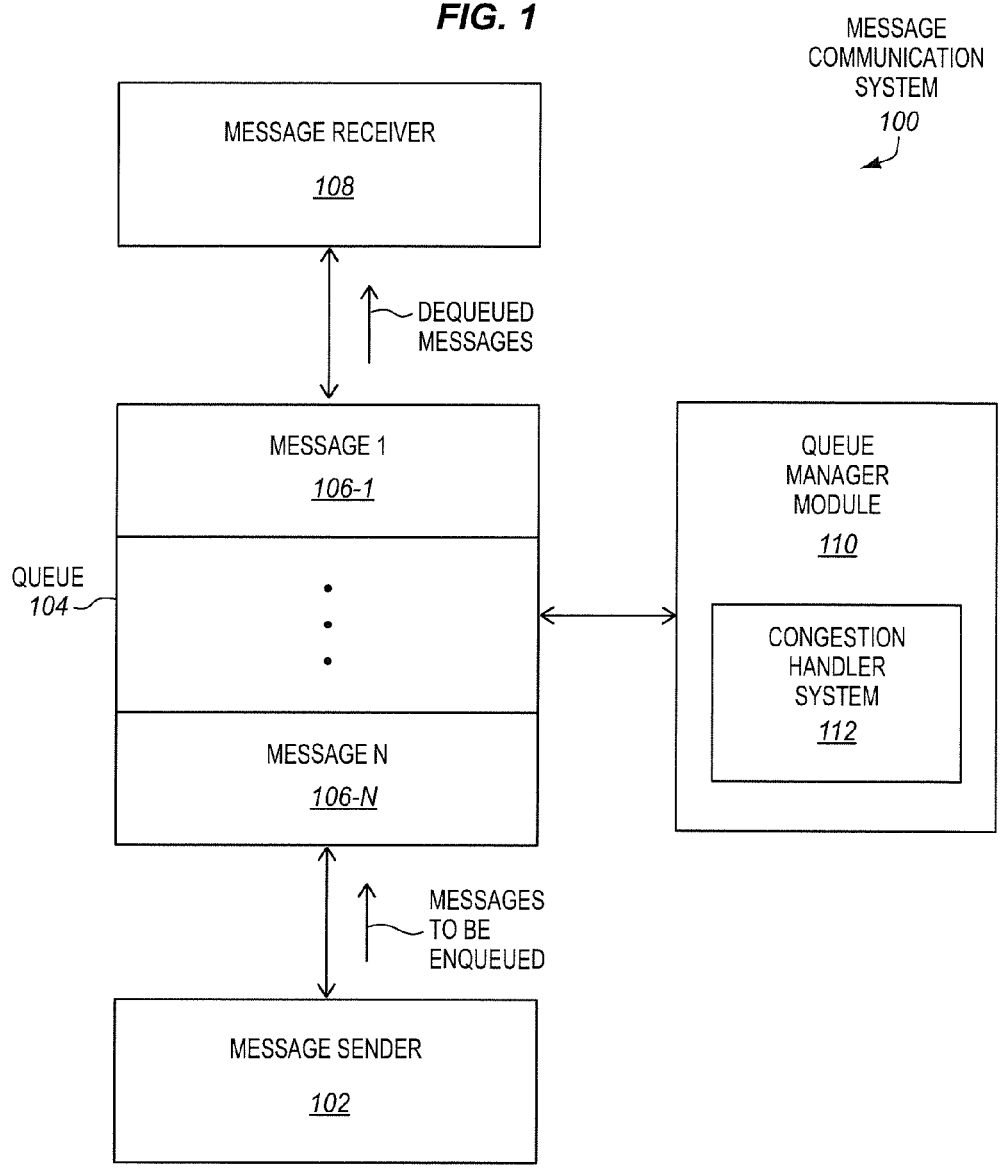
FIG. 1 is a block diagram of an embodiment of a message communication system including an embodiment of a congestion handler system that is operable to handle congestion in a queue that is used to store messages conveyed from a message sender to a message receiver.

FIG. 1 is a block diagram of an embodiment of a message communication system 100 including an embodiment of a congestion handler system 112 that is operable to handle congestion in a queue 104 that is used to store messages 106 conveyed from a message sender 102 to a message receiver 108. The message sender is coupled or otherwise in communication with the queue, and sends messages to be enqueued to the queue. The illustrated queue is a FIFO queue having stored therein message 1 106-1 through message N 106-N. The message N is the newest/youngest message stored in the queue, whereas message 1 is the oldest message stored in the queue. The message receiver is coupled or otherwise in communication with the queue, and receives dequeued messages from the queue. A queue manager module 110 is coupled or otherwise in communication with the queue to manage the queue. In the illustrated embodiment, the queue manager module includes a congestion hander system 112 to handle congestion in the queue. Alternatively, in another embodiment, the congestion handler system may be separate from the queue manager module and may be coupled or otherwise in communication with the queue.

Figure 2:
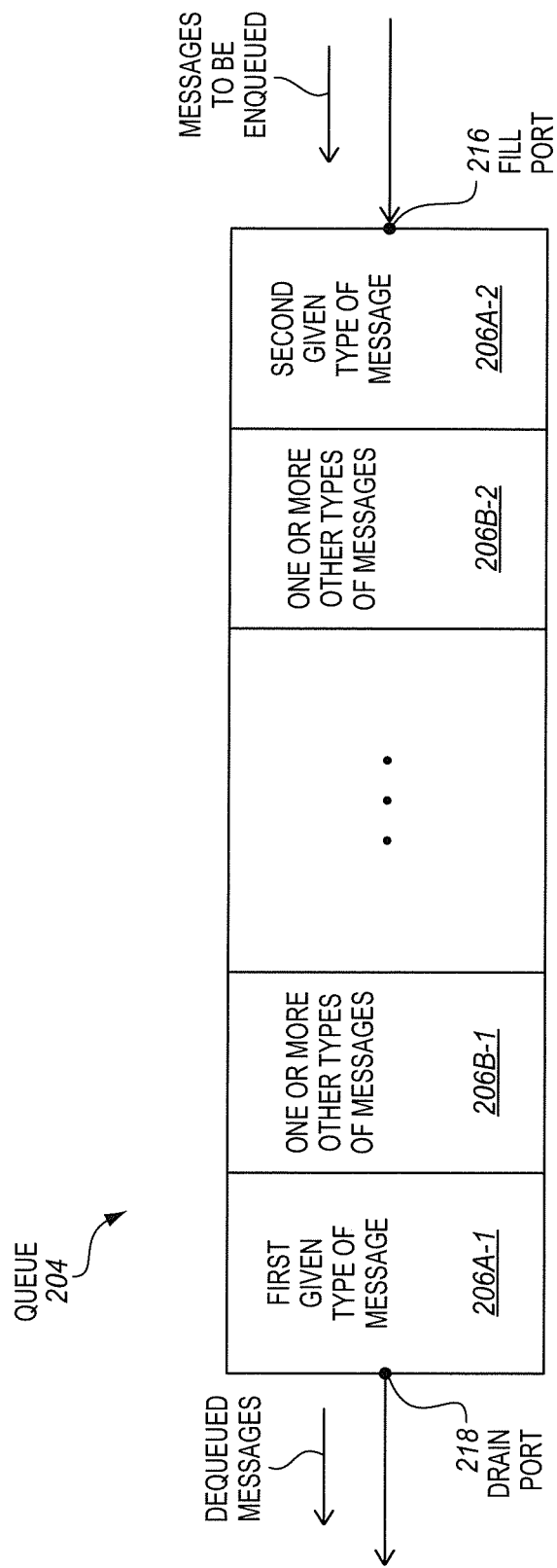
FIG. 2 is a block diagram of an example embodiment of a suitable FIFO queue.

FIG. 2 is a block diagram of an example embodiment of a suitable FIFO queue 204. The queue is a two port queue and has a fill port 216 and a drain port 218. In some embodiments, the queue may be implemented as a dual port random access memory (RAM), although this is not required. The dual port RAM may be accessible from two sides and may be used to implement the FIFO queue. Messages to be enqueued may be received from the message sender at the fill port, and dequeued messages may be provided to the message receiver from the drain port. Within the queue the messages may remain in order and may be shifted from the fill port to the drain port (in the illustration from right to left) as messages are dequeued. The illustrated queue has an example set of messages stored therein. In particular, the illustrated queue has a first given type of message 206A-1 and a second given type of message 206A-2 stored in the queue along with one or more other types of messages 206B-1, 206B-2. The first and second messages of the given type 206A-1, 206A-2 are the same type of message. As one example, the first and second messages of the given type 206A-1, 206A-2 each be a different instance of a state indication message. The one or more other types of messages 206B-1, 206B-2, at least potentially, are one or more different types of messages than the give type of message. That is, in an aspect, the given type of message, at least potentially, may be stored in the queue along with messages of one or more other types.

Figure 3:
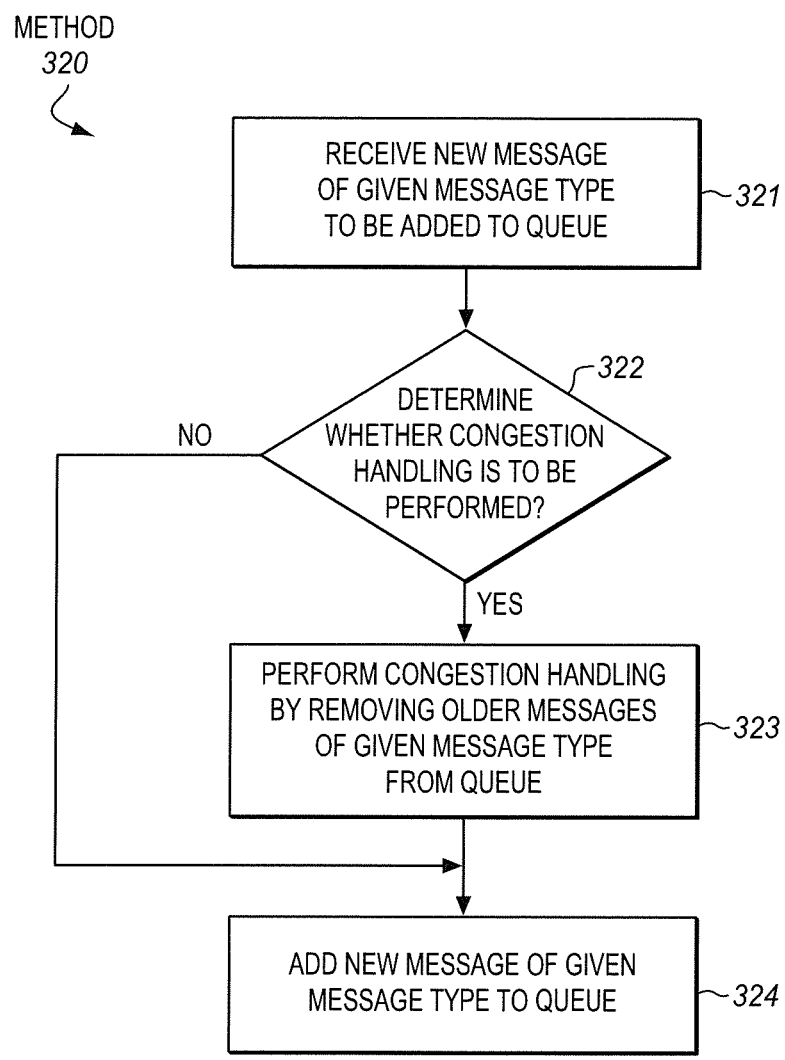
FIG. 3 is a block flow diagram of an embodiment of a method, performed in an element having a queue that is used to store messages sent from a message sender to a message receiver, of handling congestion in the queue, without discarding a new message received from the message sender.

FIG. 3 is a block flow diagram of an embodiment of a method 320, performed in an element having a queue that is used to store messages sent from a message sender to a message receiver, of handling congestion in the queue, without discarding a new message received from the message sender. In one embodiment, the method may be performed by the congestion handler system 112 of FIG. 1. Alternatively, the method may be performed by a different congestion handler system. Moreover, the congestion handler system 112 may perform methods different than the method 320.

At block 321, the new message, of a given message type, which is to be added to the queue (e.g., enqueued), is received.

In some embodiments the new message is of a type that contains state information. For example, the message may be a state indication message that is operable to indicate a state of the message sender or a component thereof. In some embodiments, aside from headers and other such fields, the body of the state indication message consists essentially of state indication information, and does not include user data or data being conveyed from the message sender to the message receiver other than the state indication information.

A determination is made whether congestion handling is to be performed, at block 322. Various different ways of determining whether congestion handling is to be performed are contemplated. In one embodiment, such a determination may include comparing a number of messages of the given message type stored in the queue with a threshold. If the number of messages of the given message type compare favorably with the threshold (e.g., the number is less than the threshold, less than or equal to the threshold, or not greater than the threshold), then it may be determined that congestion handling is not to be performed. Otherwise, if the number of messages of the given message type compare unfavorably with the threshold (e.g., the number is greater than the threshold or greater than or equal to the threshold), then it may be determined that congestion handling is to be performed.

In another embodiment, such a determination may include determining if an amount of data stored in the queue (e.g., in bits, bytes, etc.) is greater than a threshold, and determining that congestion handling is to be performed if it does, or otherwise determining that congestion handling is not be performed. In yet another embodiment, such a determination may include determining if a remaining storage volume of the queue drops below a threshold, and determining that congestion handling is to be performed if it does, or otherwise determining that congestion handling is not be performed. In a still further embodiment, rather than using a threshold, such a determination may include determining whether the new message of the given message type to be added to the queue fits in the queue (i.e., there is room in the queue to accommodate it), and determining that congestion handling is not to be performed when there is room for the new message, or determining that congestion handling is to be performed when there is not room for the new message.

These are just a few examples of ways to determinate whether congestion handling is to be performed. While it is generally desirable not to discard messages until real congestion has been encountered, the thresholds may provide a suitable standoff from real congestion condition if desired. Other approaches may be based on predicting, estimating, or otherwise determining if congestion has been encountered or is imminent.

Referring again to FIG. 3, if congestion handling is not to be performed (i.e., "no" is the determination at block 322), then the method advances to block 324. At block 324, the new message of the given message type is added to the queue. For example, the new message may be added to the tail of the queue.

Alternatively, if congestion handling is to be performed (i.e., "yes" is the determination at block 322), then the method advances to block 323. At block 323, congestion handing is performed by removing one or more older messages of the given message type from the queue in accordance with an embodiment of the invention. In some embodiments, this may include identifying and selectively removing the one or more older messages of the given message type from the queue without removing messages of one or more different message types from the queue. In various embodiments, anywhere from one, a few, a number just sufficient to alleviate congestion (e.g., as determined by the approach at block 322), most, or all of the older messages of the given message type may be removed from the queue. Advantageously, removing these older messages from the queue may help to at least partially alleviate or reduce the level of congestion. In some embodiments, a number older messages removed may optionally be assimilated into the new message so that this information is not lost, although this is not required.

The method then advances from block 323 to block 324, where the new message of the given message type is added to the queue. In some embodiments, the new message may be inserted at the tail of the queue. Alternatively, in other embodiments, the new message may optionally be inserted at an intermediate position in the queue (e.g., in place of an older message that was removed).

Advantageously, the congestion in the queue may be handled without discarding or dropping the new message, and therefore without losing the information content of the new message. Rather, one or more older messages already stored in the queue may be removed from the queue to handle the congestion. This may offer advantages, especially for messages of a type in which the older messages have less-updated, stale, or outdated information as compared to the new message which has more updated information. For example, this may be the case for various types of state indication messages in which only the most recently received state indication message indicates the current/present state. With the illustrated method, more updated, more relevant, or more useful information is retained by removing less updated, less relevant, or less useful information.

Figure 4:
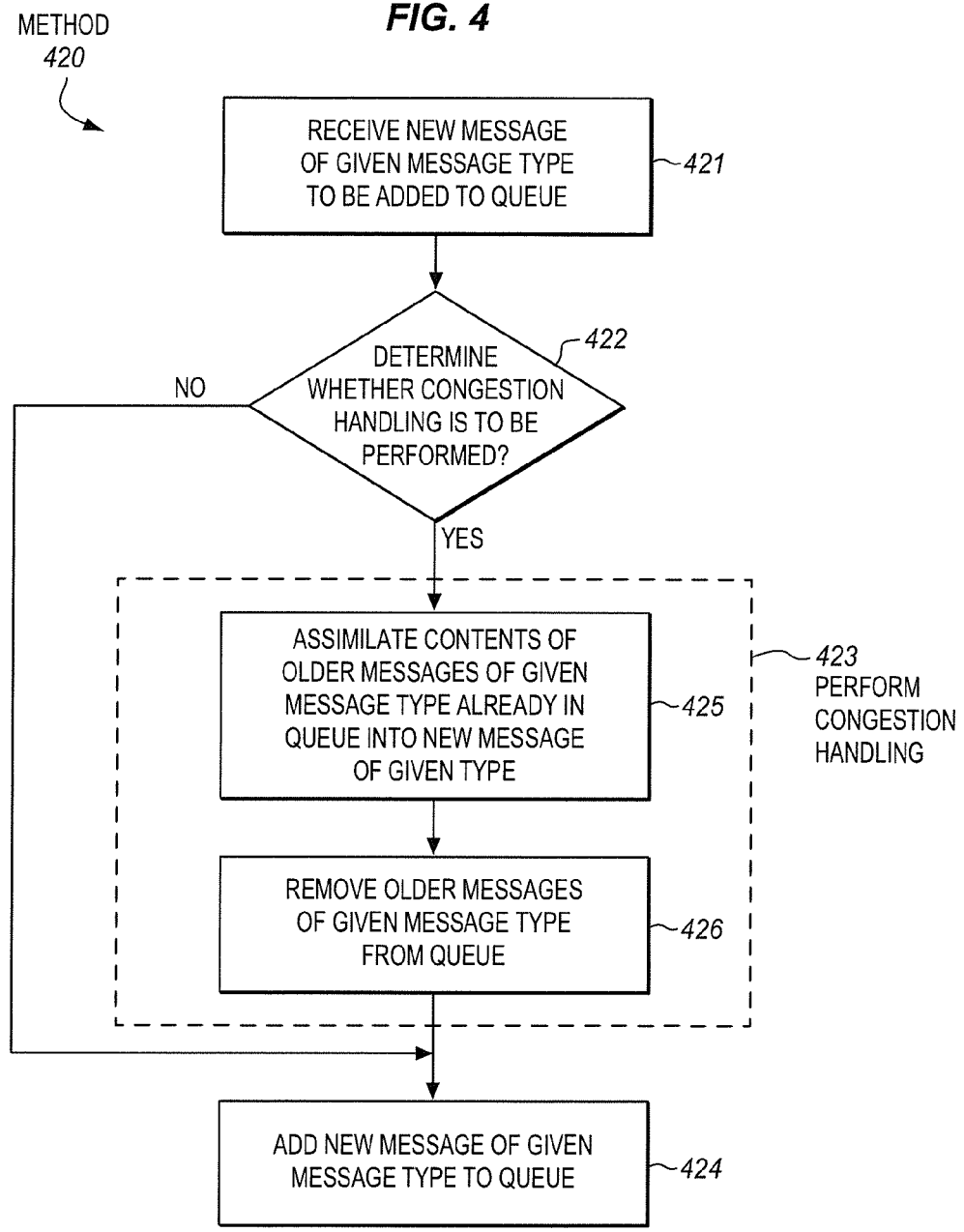
FIG. 4 is a block flow diagram of an embodiment of a method, performed in an element having a queue that is used to store messages sent from a message sender to a message receiver, of handling congestion in the queue, without discarding a new message received from the message sender, which includes assimilating contents of older messages removed from queue to handle the congestion into the new message.

FIG. 4 is a block flow diagram of an embodiment of a method 420, performed in an element having a queue that is used to store messages sent from a message sender to a message receiver, of handling congestion in the queue, without discarding a new message received from the message sender, which includes assimilating contents of older messages removed from queue to handle the congestion into the new message. In one embodiment, the method may be performed by the congestion handler system 112 of FIG. 1. Alternatively, the method may be performed by a different congestion handler system. Moreover, the congestion handler system 112 may perform methods different than the method 420.

At block 421, the new message, of a given message type, which is to be added to the queue (e.g., enqueued), is received. In some embodiments, the new message of the given message type has content that is mathematically (e.g., arithmetically) combinable with contents of older messages of the same type. Certain types of information have meaning when added or otherwise mathematically combined with other information of the same type. For example, a count of items or events in one time has meaning when added or combined with a count of items or events in another time. As an example, counts of tasks completed within a sequence of time periods may be added together to obtain a total count of tasks completed over a cumulative time period. Other types of information have meaning when otherwise mathematically combined (e.g., integrated, processed by equations, statistically processed, etc.). In contrast, state indication information and other types of information do not have very useful meaning when added with other information of the same type. For example, a state of a thing (e.g., on versus off, ready versus not ready, transmitting versus not transmitting, full versus not full, etc.) measured at one time may not be very meaningfully added to a state of the thing measured at another time. It is not the sum that gives the final state, but rather the most recent state alone. In some embodiments, the new message of the given message type may have content that represents quantitative relative variation information. By relative variation information it is meant that the content includes information that quantifies a variation of a parameter relative to a previous number or content. A specific example of quantitative relative variation information is a number of items or events counted in a given period of time.

A determination is made whether congestion handling is to be performed, at block 322. Various different ways of determining whether congestion handling is to be performed are contemplated. The approaches previously described for block 322 of FIG. 3, among others, are suitable.

If congestion handling is not to be performed (i.e., "no" is the determination at block 422), then the method advances to block 424. At block 424, the new message of the given message type is added to the queue. For example, the new message may be added to the tail of the queue.

Alternatively, if congestion handling is to be performed (i.e., "yes" is the determination at block 422), then the method advances to block 423. At block 423, congestion handing is performed. The congestion handling performed includes the operations performed at block 425 and block 426.

At block 425, contents of one or more older messages of the given message type already stored in the queue, which are to be removed from the queue, are assimilated into the new message of the given message type, in accordance with an embodiment. In one embodiment, assimilating the contents may include identifying the contents in the older messages, reading or otherwise obtaining the contents from the older messages, and mathematically (e.g., arithmetically) combining the contents of the older messages with a corresponding content of the new message. By way of example, depending upon the particular type of content, arithmetically combining the contents may include adding the contents or subtracting the contents. For example, counts in the older messages may be added to a count in the new message. The scope of the invention is not limited to what type of things or events are counted, but a few possible examples are events observed, events handled, items received, things meeting a certain criteria, etc. Alternatively, in another embodiment, rather than mathematically combining the contents, assimilating the contents may include identifying the contents in the older messages, reading or otherwise obtaining the contents from the older messages, and inserting or otherwise introducing the contents from the older messages into the new message. In an aspect, the introduced contents may be arithmetically combined at another time (e.g., by a message receiver when processing the new message). Advantageously, assimilating the contents of these older messages, which are to be removed from the queue, may help to avoid losing the information in the assimilated contents.

At block 426, the one or more older messages of the given message type, from which the content was assimilated, are removed from the queue in accordance with an embodiment of the invention. In some embodiments, this may include selectively removing the one or more older messages of the given message type from the queue without removing messages of one or more different message types from the queue. In various embodiments, anywhere from one, a few, a number just sufficient to alleviate congestion (e.g., as determined by the approach at block 322), most, or all of the older messages of the given message type may be removed from the queue. Advantageously, removing these older messages from the queue may help to at least partially alleviate or reduce the level of congestion. In some embodiments, the number of older messages removed may optionally be counted and added or assimilated with the new message so that this information is not lost, although this is not required.

The method then advances from block 423 to block 424, where the new message of the given message type is added to the queue. In some embodiments, the new message may be introduced at the tail of the queue. Alternatively, in other embodiments, the new message may optionally be introduced at an intermediate position in the queue (e.g., in place of an older message that was removed).

Advantageously, the congestion in the queue may be handled without discarding or dropping the new message, and therefore without losing the information content of the new message. Rather, one or more older messages already stored in the queue may be removed from the queue to handle the congestion. As a further advantage, the contents of the one or more older messages removed from the queue may be assimilated into the new message so that the contents are not lost when the one or more older messages are removed from the queue.

Figure 5:
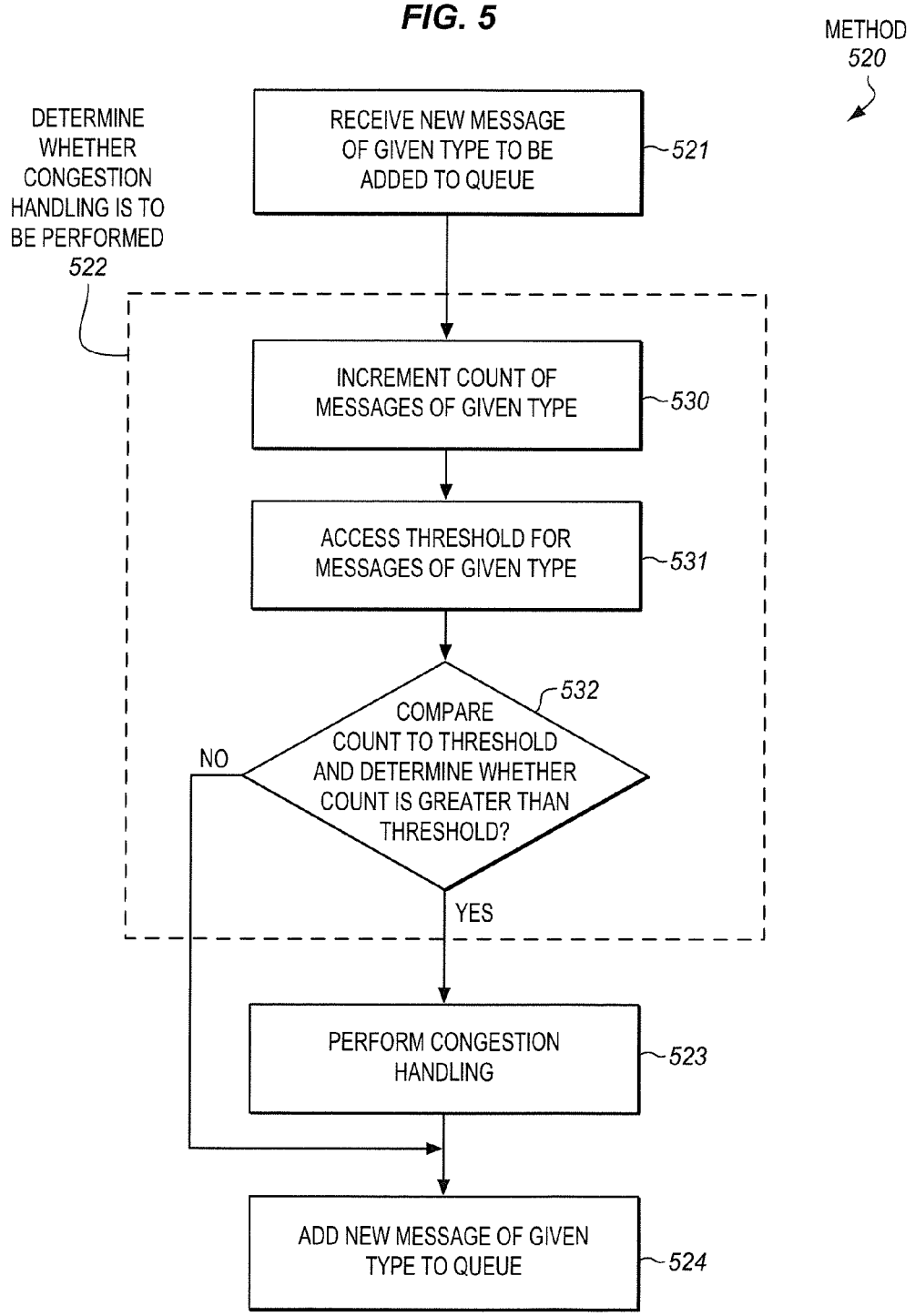
FIG. 5 is a block flow diagram of an embodiment of a method, performed in an element having a queue that is used to store messages sent from a message sender to a message receiver, of handling congestion in the queue, without discarding a new message received from the message sender, which includes an example embodiment of determining whether congestion handling is to be performed.

FIG. 5 is a block flow diagram of an embodiment of a method 520, performed in an element having a queue that is used to store messages sent from a message sender to a message receiver, of handling congestion in the queue, without discarding a new message received from the message sender, which includes an example embodiment of determining whether congestion handling is to be performed. In one embodiment, the method may be performed by the congestion handler system 112 of FIG. 1. Alternatively, the method may be performed by a different congestion handler system. Moreover, the congestion handler system 112 may perform methods different than the method 520. The embodiment of determining whether congestion handling is to be performed is also suitable for use in the method 320 of FIG. 3 and in the method 420 of FIG. 4.

At block 521, the new message, of a given message type, which is to be added to the queue (e.g., enqueued), is received. The new message may be of the type previously described in conjunction with either block 321 of FIG. 3 or block 421 of FIG. 4.

At block 522, a determination is made whether congestion handling is to be performed. The determination of whether congestion handling is to be performed includes operations at blocks 530-532. At block 530, a count of messages of the given type is incremented. At block 531, a threshold for messages of the given type is accessed (e.g., from a memory or other storage location). Then, the count is compared to the threshold and a determination is made whether the count compares favorably with the threshold, at block 532. The threshold may represent a predetermined threshold (e.g., a preconfigured parameter stored in a memory or configuration register). In one embodiment, the threshold may correspond to the maximum number of messages of the given message type that should be present in the queue at any given time. By way of example, the threshold may selected to be an approximate fraction of the total queue size appropriate for the particular implementation. In the illustration, the determination involves determining whether the count is greater than the threshold (i.e., compares unfavorably), although the scope of the invention is not limited to this particular comparison. Other embodiments may involve determining whether the count is greater than or equal to the threshold (i.e., compares unfavorably), less than the threshold (i.e., compares favorably), less than the threshold by a given tolerance (i.e., compares favorably), etc.

If congestion handling is not to be performed (i.e., "no" is the determination at block 532, meaning that the count compares favorably with the threshold), then the method advances to block 524. At block 524, the new message of the given message type is added to the queue.

Alternatively, if congestion handling is to be performed (i.e., "yes" is the determination at block 532, meaning that the count does not compare favorably with the threshold), then the method advances to block 523. At block 523, congestion handing is performed. The congestion handling may be performed as described in conjunction with either block 323 of FIG. 3 or block 423 of FIG. 4 (e.g., depending upon the type of the new message received and/or whether the content of the new message is mathematically combinable with corresponding content of older messages of the same type). Recall that both block 323 and block 423 involved removing older messages of the given message type.

The method then advances from block 523 to block 524, where the new message of the given message type is added to the queue. In some embodiments, the new message may be introduced at the tail of the queue. Alternatively, in other embodiments, the new message may optionally be introduced at an intermediate position in the queue (e.g., in place of an older message that was removed).

Advantageously, use of such an embodiment of determining whether congestion handling is to be performed allows use of a configurable threshold that is easy to adjust in order to handle congestion for various different environments and implementations. Moreover, using the count of the number of messages of the given message type may be very useful especially for messages where there is normally not a high count of messages of the given message type in the queue except under an extreme condition (e.g., a misconfiguration, a problem situation, etc.) where many messages of the given type flood the queue, since this approach may readily detect this condition prior to harmful congestion being encountered.

Figure 6:
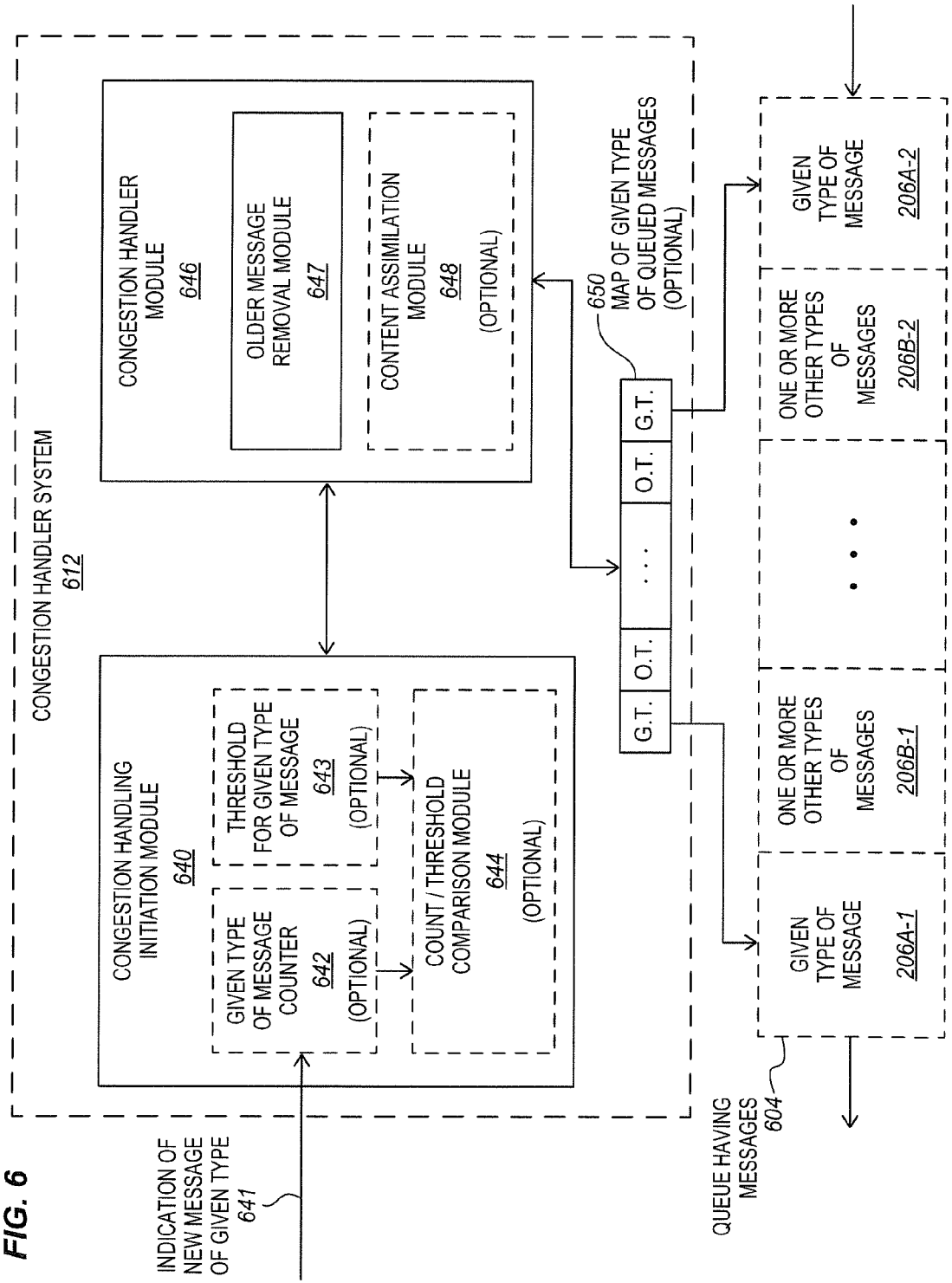
FIG. 6 is a block diagram of an embodiment of a congestion handler system that is operable to handle congestion in a queue without discarding a new message from a message sender.

FIG. 6 is a block diagram of an embodiment of a congestion handler system 612 that is operable to handle congestion in a queue without discarding a new message from a message sender. The congestion handler system is operable to be deployed in an element having a queue to store messages sent from the message sender to a message receiver. In some embodiments, the congestion handler system may perform the method of any of FIGS. 3-5. Alternatively, in the congestion handler system may perform different methods. Moreover, the methods of FIGS. 3-5 may be performed by a congestion handler system different than that of FIG. 6.

The congestion handler system includes a congestion handling initiation module 640. The congestion handling initiation module is operable to receive an indication 641 that the new message of a given message type is to be added to the queue. For example, a queue manager module may inform the congestion handler system that the new message is to be added to the queue. The congestion handling initiation module is operable to determine whether congestion handling is to be performed. As shown, in one embodiment, the congestion handling initiation module may optionally include a given type of message counter 642 that is operable to keep or maintain a count of messages of the given type which are stored/present in the queue. The given type of message counter may increment the count upon receipt of the indication of the new message of the given type to be added to the queue. The given type of message counter may decrement the count when messages of the given message type are dequeued or otherwise removed from the queue. In such an embodiment, the congestion handling initiation module may optionally include a threshold 643 for the given type of message. The congestion handling initiation module may optionally include a count/threshold comparison module 644 coupled or otherwise in communication to receive the count and the threshold, and operable to compare the count with the threshold to determine whether the count compares favorably or unfavorably with the threshold. Alternatively, the congestion handler system may determine whether to perform congestion handling by other approaches as disclosed herein besides using such a count/threshold approach.

The congestion handler system also includes a congestion handler module 646. The congestion handler module is coupled or otherwise in communication with the congestion handling initiation module 640. The congestion handler module is operable to be initiated in response to the congestion handling initiation module determining that the congestion handling is to be performed. The congestion handler module includes an older message removal module 647. The older message removal module is operable to remove older messages of the given message type from the queue (i.e., messages of the given message type older than the new message of the given message type). As shown, in some embodiments, the congestion handler module may be coupled or otherwise in communication with an optional map 650 of the given type of messages to locations in the queue 604. In the illustrated map, G.T.'s are pointers to the given type of messages 206A-1, 206A-2 in the queue, whereas O.T.'s are pointers to other types of messages 206B-1, 206B-2 in the queue. Other data structures capable of keeping track of the given type of messages in the queue are also suitable. Alternatively, rather than using such a map or other data structure, in another embodiment, the congestion handler module may be operable to examine or inspect the messages in the queue to determine their type (e.g., by examining their message headers) at the time when the older messages are to be removed. Advantageously, the congestion handler module is operable to handle congestion in the queue without discarding the new message or losing its message content.

As shown, in some embodiments, the congestion handler module may further include an optional content assimilation module 648. The content assimilation module may be operable to assimilate contents of one or more older messages of the given message type, which are to be removed from the queue, into the new message. The content assimilation module may be operable to perform the different types of content assimilation previously described. Advantageously, in embodiments where it is included, the content assimilation module may help to assimilate content from the older messages so that the content is not lost when the older messages are removed from the queue.

The congestion handler system and its modules may be implemented in hardware, firmware, software, or a combination thereof. In some embodiments, the congestion handler system is implemented on a network element having an interface to a network and/or a portion thereof (e.g., a line card and/or a control card). In other embodiments, the congestion handler system is implemented in a system having at least one processor, a bus, and a memory coupled with the processor by a bus.

Figure 7:
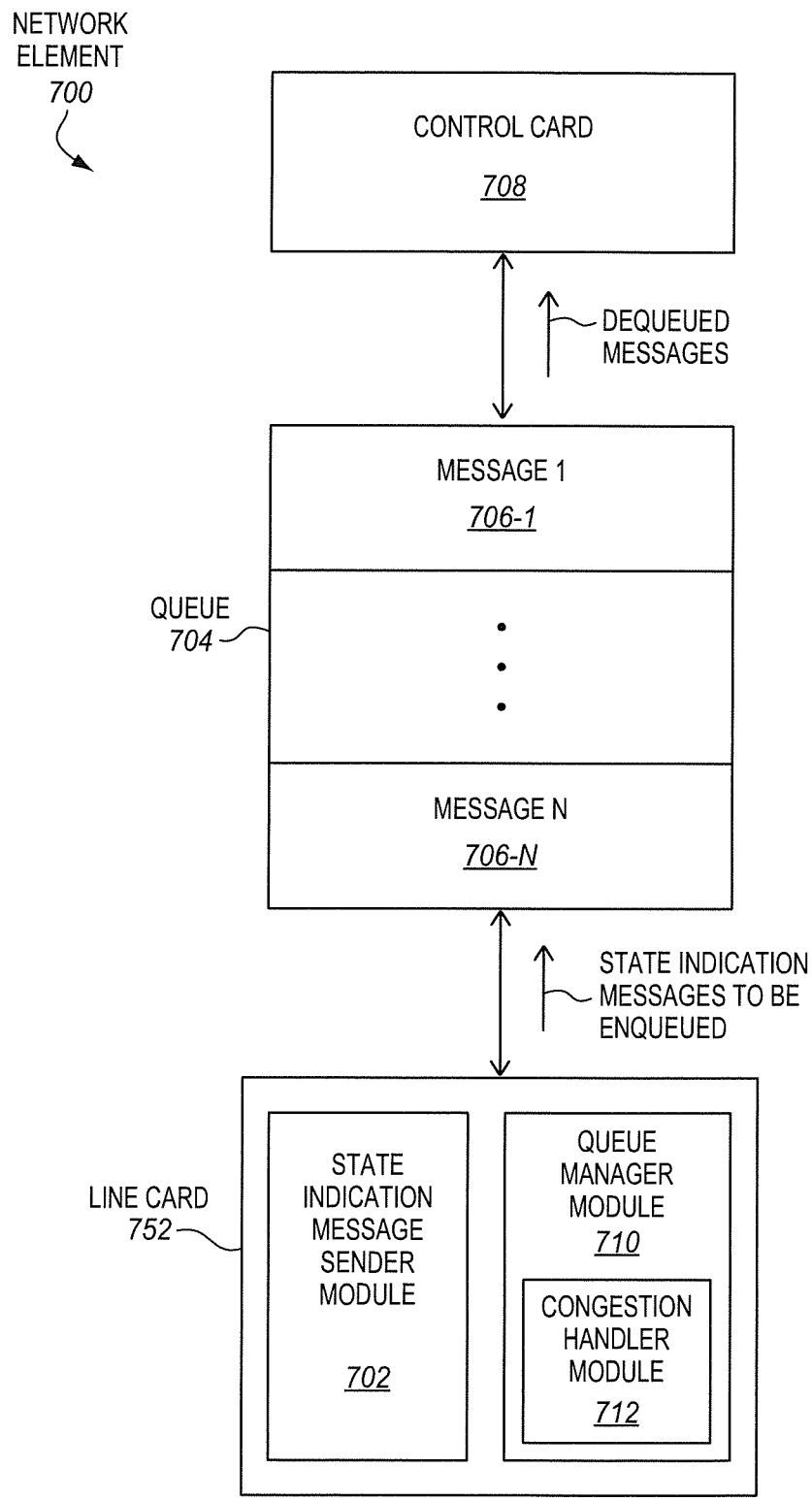
FIG. 7 is a block diagram of a network element that is operable to handle congestion due in part to a number of state indication messages being exchanged within the network element, without discarding a new state indication message.

FIG. 7 is a block diagram of a network element 700 that is operable to handle congestion due in part to a number of state indication messages being exchanged within the network element, without discarding a new state indication message. In some embodiments, the network element may perform the method 320 of FIG. 3. Alternatively, the network element may perform a different method. Moreover, the method 320 may be performed by a different network element.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOW) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

The network element includes a line card 752, a control card 708, and a queue 704 that is coupled or in communication with the line card and the control card. In some embodiments, the line card may be an optical carrier (OC) synchronous transport module (STM) packet over SONET (POS) channelized card, although the scope of the invention is not so limited. SONET refers to Synchronous Optical Network. For example, the line card may be an 8 OC3/STM1 POS channelized card, or a 2 OC12/STM4 POS channelized card. The queue is operable to store state indication messages 706-1 through 706-N sent from the line card to the control card. The state indication messages may have any of various different message protocols used in the art for messages exchanged between line and control cards. Commonly, these are proprietary communication protocols, rather than standardized protocols.

Referring again to FIG. 7, the line card includes a state indication message sender module 702 that is operable to send the state indication messages. In some embodiments, the message sender module may represent a state monitor application, process, task, software component, or the like, which is operable to run on the line card (i.e., a line card module or other entity) to monitor a state associated with the line card (e.g., the state of the line card or a component thereof), and send the state indication messages. The message sender module may include software stored on a memory of the line card that is executable by processor(s) of the line card. In another aspect, the message sender module may include a combination of software and one or more of firmware and hardware. As will be discussed further below in conjunction with FIG. 8, in some embodiments, the message sender module may be a module that is operable to monitor an on/off state of a port of the line card and send port on/off state indication messages, although the scope of the invention is not so limited.

The line card also includes a queue manager module 710 that is operable to manage the queue. As shown, in one embodiment, the queue manager module includes the congestion handler module 710. Alternatively, in another embodiment, the congestion handler module may be separate from the queue manager module. The congestion handler module 712 is operable to handle the congestion in the queue. In some embodiments, the congestion may be due in part to a number of state indication messages (e.g., a larger than typical number) being sent from the message sender module. In some embodiments, the congestion handler module is operable to handle the congestion without discarding a new state indication message received from the line card. In some embodiments, the congestion handler module may represent a congestion handler application, process, task, software component, routine, subroutine, or the like, or a combination thereof, which is operable to run on the line card (i.e., a line card module or other entity) to handle the congestion. The congestion handler module may include software stored on a memory of the line card that is executable by processor(s) of the line card. In another aspect, the congestion handler module may include a combination of software and one or more of firmware and hardware. Advantageously, the network element is operable to handle the congestion in the queue without the new state indication message being discarded.

Figure 8:
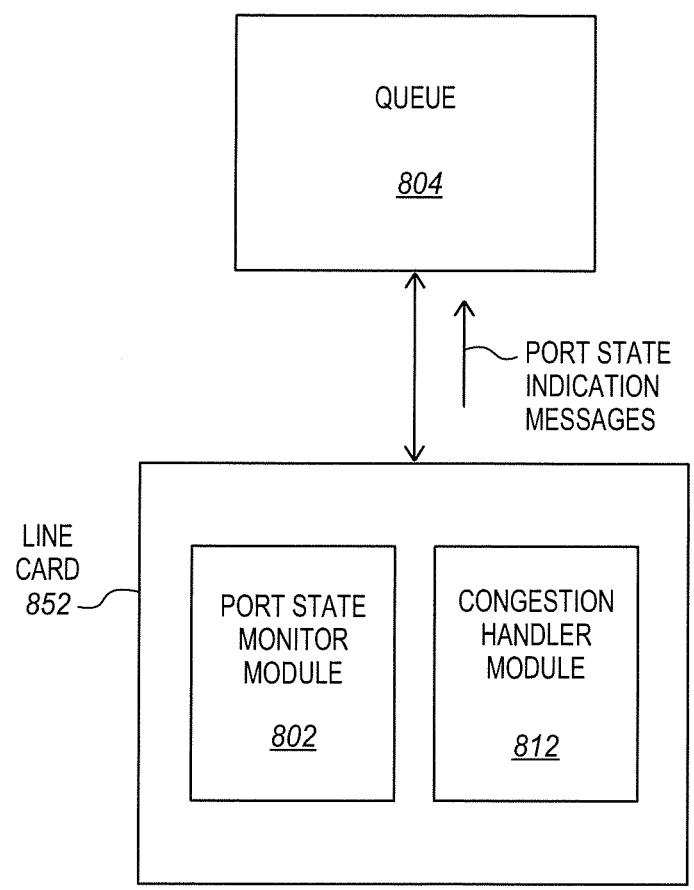
FIG. 8 is a block diagram of a line card having a port state monitor module that is operable to monitor a state of a port of the line card and send port state indication messages to a queue.

FIG. 8 is a block diagram of a line card 852 having a port state monitor module 802 that is operable to monitor a state of a port of the line card and send port state indication messages to a queue 804. The port state monitor module represents an embodiment of a message sender module. In some embodiments, the port state monitor module may be operable to monitor an on/off state of the port of the line card and send port on/off state indication messages to indicate whether the port is on or off. In typical operation, the port on/off state changes relatively infrequently, and accordingly in typical operation few port on/off state indication messages may be stored in the queue at any given time. In typical operation, the number of stored port on/off state indication messages is insufficient to cause congestion and tends not to significantly contribute to congestion. In some situations (e.g., when inappropriate transmission rates on configured within the network element), port flapping may occur. The port flapping may involve a higher than normal number (e.g., a flurry) of on/off port state changes, and a corresponding higher than normal number (e.g., a flurry) of port on/off state indication messages to be sent from the line card. In such situations, the higher number of the port on/off state indication messages in the queue may become sufficient to cause congestion and/or may at least significantly contribute to congestion in the queue.

The line card also has a congestion handler module 812. When it is determined that congestion handling is to be performed, an approach similar to that described above (e.g., with respect to FIG. 3) may be used to handle the congestion.

One or more (e.g., one, some, a majority, a number sufficient to alleviate congestion, or all) older port on/off state indication messages may be removed from the queue in order to help alleviate the congestion. The newer port on/off state indication message may be stored in the queue. In some embodiments, the less important information describing the number of port on/off state changes may be lost, or in other embodiments the number of messages may be assimilated into the new message. However, the newest, most up-to-date, relevant, and useful port on/off state indication message is not discarded.

Figure 9:
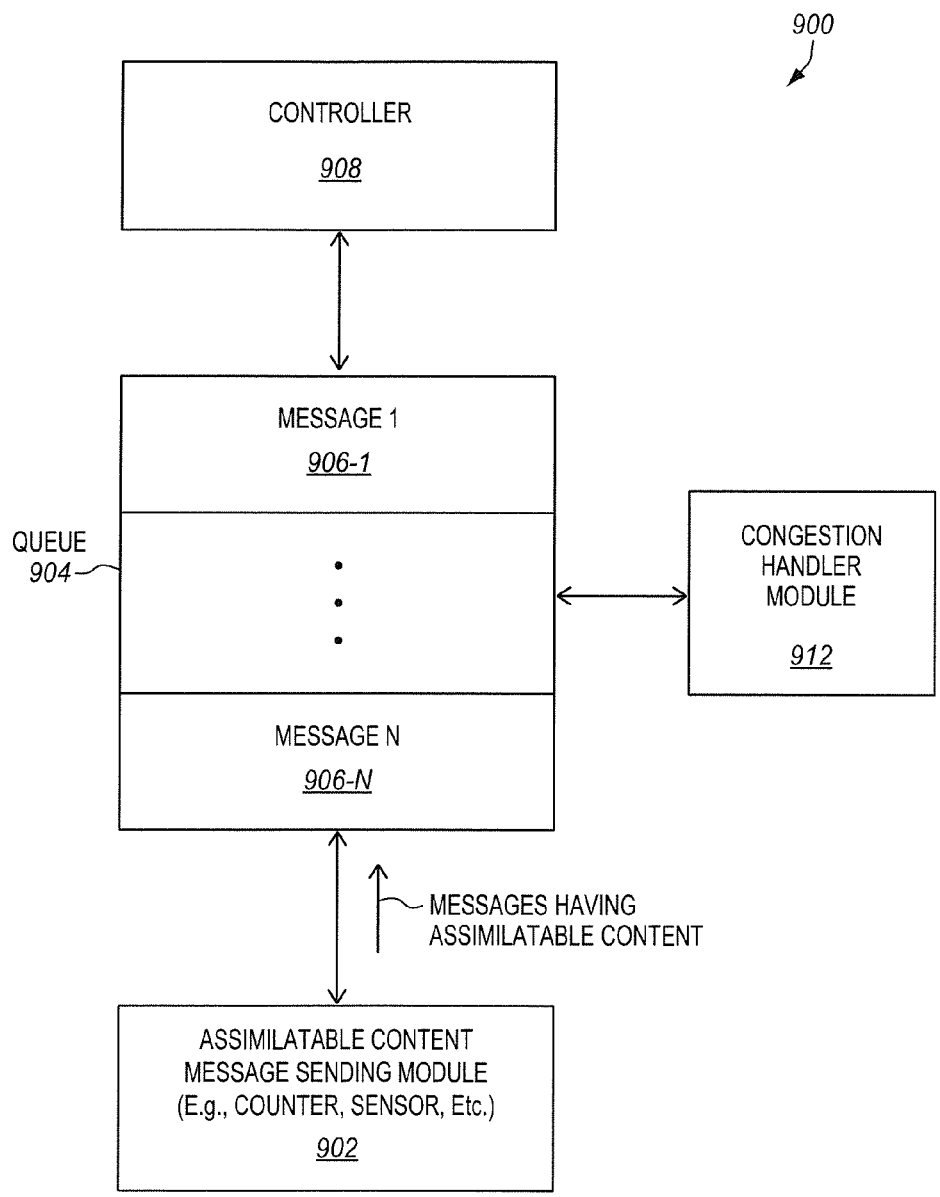
FIG. 9 is a block diagram of a message communication system including an embodiment of an assimilatable content message sender module that is operable to send messages having assimilatable content to a queue and an embodiment of a congestion handler module that is operable to handle congestion in the queue, without discarding a new message having assimilatable content.

FIG. 9 is a block diagram of a message communication system 900 including an embodiment of an assimilatable content message sender module 902 that is operable to send messages having assimilatable content to a queue 904 and an embodiment of a congestion handler module 912 that is operable to handle congestion in the queue, without discarding a new message having assimilatable content. In some embodiments, the system may perform the method 420 of FIG. 4. Alternatively, the system may perform a different method. Moreover, the method 420 may be performed by a different system.

The assimilatable content message sender module is operable to send messages that include content that may be assimilated with content of other messages in a meaningful way. In some embodiments, the content may be mathematically (e.g., arithmetically) combined with content of other messages in a meaningful way. In some embodiments, the content may be counts. Alternatively, the content may be other types of assimilatable content disclosed elsewhere herein. As one example, the assimilatable content message sender module may be a counter module that is operable to count items or events and send the count of the items or events in a message. As another example, the assimilatable content message sender module may be a sensor that is operable to senses items, events, or things (e.g., performance monitoring events, transmission rates, power consumed, thermal events (e.g., temperatures), or the like.), and send an indication of the sensed information.

The queue is coupled or in communication with the assimilatable content message sender module and a controller 908. The messages 906-1 through 906-N may be stored in the queue. The controller may receive the messages from the queue. In one aspect, the controller is operable to control the system or a component thereof (e.g., a component having or most closely associated with the assimilatable content message sender module) based on the messages.

The congestion handler module 912 is coupled or in communication with the queue. In one aspect, congestion may be caused by a slowing down of draining or dequeuing rate. For example, this may be caused by the controller having a high workload, being busy, or temporarily being down. This may cause the number of messages having the assimilatable content to increase over time in the queue and may contribute to and/or cause the congestion. The congestion handler module is operable to handle congestion in the queue, without discarding a new message having assimilatable content. In some embodiments, the congestion handler module may remove one or more older messages of the same type as the new message from the queue and assimilate content of the one or more older removed messages into the new message. For example, the congestion handler module may add counts from the older messages to a count in the newer message. The less important information describing the number of objects counted for each message (e.g., during each period of time) may be lost, but the total number of objects counted may be retained so that it can be provided to the controller.

In various embodiments, the system 900 may represent any of a wide variety of different types of systems in which an assimilatable content message sending module and a controller (or other component) exchange messages through a queue that may experience congestion. Examples of systems include, but are not limited to, network elements, communications equipment, base stations, equipment within cellular or mobile backhauls, vehicles, etc.

Figure 10:
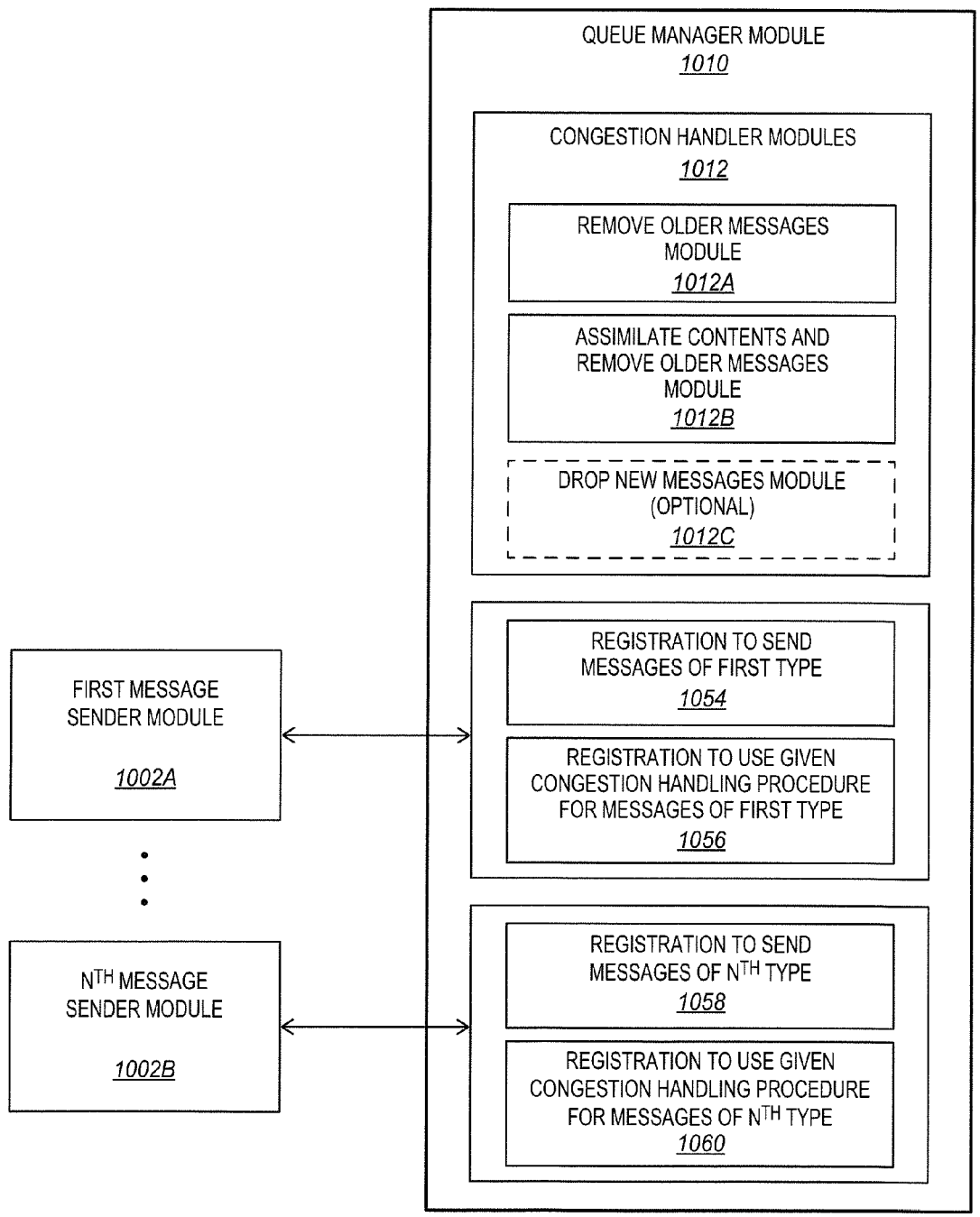
FIG. 10 is a block diagram of a first message sender module and an Nth message sender module registering with a queue manager module to send messages and use particular congestion handling procedures.

FIG. 10 is a block diagram of a first message sender module 1002A and an Nth message sender module 1002B registering with a queue manager module 1010 to send messages and use particular congestion handling procedures. The queue manager module includes a set of congestion handler modules 1012. In the illustrated embodiment, these include a remove older messages congestion handler module 1012A that is operable to remove older messages from a queue to handle congestion. An assimilate contents and remove older messages congestion handler module 1012B is operable to assimilate contents of older messages into a new message and remove the older messages from a queue to handle congestion. An optional drop new message congestion handler module 1012C is operable to drop a new message to handle congestion. In other embodiments, fewer or more different types of congestion handler modules may be included.

The first and the Nth message sender modules 1002A/B communicate with the queue manager module 1010. The first message sender module creates a registration 1054 to send messages of a first type. The first message sender module also creates a registration 1056 to use a given congestion handling procedure (e.g., one of the modules 1012) for the messages of the first type. The Nth message sender module creates a registration 1058 to send messages of an Nth type. The Nth message sender module also creates a registration 1060 to use a given congestion handling procedure (e.g., one of the modules 1012) for the messages of the Nth type. Accordingly, in an embodiment, different congestion handling procedures or modules may be used for different types of messages.

As described above, congestion handling may be performed by approaches specific to the different types of messages and/or may be content aware. While two different types of messages have been emphasized, three, four, or more different approaches specific to three, four, or more different types of messages may be used in other embodiments. Embodiments have been described in which a line card sends messages to a control card. Other embodiments pertain to analogous approaches where the control card sends messages to the line card.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Communication does not require physical or electrical contact.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media.

A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like. The tangible storage media may include one or more solid or tangible physical materials, such as, for example, a semiconductor material, a phase change material, a magnetic material, etc. Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein.

A few representative examples of non-tangible transitory computer-readable communication or transmission media include, but are not limited to, electrical, optical, acoustical or other form of propagated signals—such as carrier waves, infrared signals, digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method in an element having a queue used to store messages sent from a message sender to a message receiver, of handling congestion in the queue without discarding a new message from the message sender, said method comprising:
   receiving the new message, of a given message type, which is to be added to the queue;
   determining whether congestion handling is to be performed;
   in response to determining congestion handling is to be performed, identifying one or more older messages in the queue that has a same message type as the given message type of the new message;
   performing the congestion handling by:
      removing the identified one or more older messages, of the given message type, from the queue; and
      assimilating contents of the identified one or more older messages into the new message so that the contents of the identified one or more older messages are not lost, without assimilating entire message of the identified one or more older messages into the new message; and
   adding the new message that includes contents of the identified one or more older messages to the queue.

2. The method of claim 1, wherein receiving the new message comprises receiving the new message from a line card of a network element, and further comprising a control card of the network element accessing the new message from the queue.

3. The method of claim 1, wherein assimilating the contents of the older messages into the new message comprises mathematically combining the contents of the older messages with a content of the new message.

4. The method of claim 1, wherein assimilating the contents of the older messages into the new message comprises adding counts of the older messages to a count of the new message.

5. The method of claim 1, wherein determining that the congestion handling is to be performed comprises:
   incrementing a count of messages of the given message type present in the queue;
   accessing a threshold for the messages of the given message type; and
   comparing the count with the threshold.

6. A congestion handler system, which is operable to be deployed in an element having a queue to store messages sent from a message sender to a message receiver, the congestion handler system operable to handle congestion in the queue without discarding a new message from the message sender, the congestion handler system comprising:
   a congestion handling initiation module, the congestion handling initiation module operable to receive an indication that the new message of a given message type is to be added to the queue, the congestion handling initiation module operable to determine whether congestion handling is to be performed; and a congestion handler module in communication with the congestion handling initiation module, the congestion handler module operable to be initiated in response to the congestion handling initiation module determining that the congestion handling is to be performed, the congestion handler module including an older message removal module, the older message removal module operable to in response to the congestion handling initiation module determining that the congestion handling is to be performed, identify one or more older messages in the queue that has a same message type as the given message type of the new message, and to remove the identified one or more older messages of the given message type from the queue, the congestion handler module further including a content assimilation module, the content assimilation module operable to assimilate contents of the identified one or more older messages into the new message so that the contents of the identified one or more older messages are not lost, without assimilating entire message of the identified one or more older messages into the new message.

7. The congestion handler system of claim 6, wherein the congestion handler system is operable to be deployed in a network element, and wherein the queue is to store messages sent from a line card of the network element to a control card of the network element.

8. The congestion handler system of claim 6, wherein the older message removal module is operable to remove older state indication messages from the queue.

9. The congestion handler system of claim 8, wherein the older state indication messages comprise older port status indication messages that indicate status of a port of a line card of a network element.

10. The congestion handler system of claim 6, wherein the congestion handler module comprises a content assimilation module that is operable to assimilate contents of the older messages into the new message.

11. The congestion handler system of claim 10, wherein the content assimilation module is operable to mathematically combine the contents of the older messages with a content of the new message.

12. The congestion handler system of claim 10, wherein the contents of the older messages comprise counts, and wherein the content assimilation module is operable to add the counts to a count of the new message.

13. The congestion handler system of claim 6, wherein the congestion handling initiation module comprises:

a counter operable to keep a count of messages of the given type which are present in the queue;
a threshold for the messages of the given message type; and
a count-threshold comparison module operable to compare the count with the threshold.

14. The congestion handler system of claim 6, wherein the congestion handling initiation module comprises instructions stored on a machine-readable storage medium of a line card of a network element.

15. A network element that is operable to handle congestion due in part to a number of state indication messages being exchanged within the network element, without discarding a new state indication message, the network element comprising:

a line card;
a control card;
a queue coupled with the line card and the control card, the queue operable to store state indication messages sent from the line card to the control card;
a congestion handler system operable to handle the congestion in the queue, without discarding the new state indication message sent from the line card, wherein the new state indication message is operable to indicate a state associated with the line card, the congestion handler system comprising:
 a congestion handling initiation module, the congestion handling initiation module operable to determine whether the congestion handling is to be performed; and
 a congestion handler module in communication with the congestion handling initiation module, the congestion handler module operable to be initiated to perform the congestion handling in response to the congestion handling initiation module determining that the congestion handling is to be performed, the congestion handler module including a message removal module that is operable to remove state indication messages from the queue, wherein the state indication messages to be removed were in the queue prior to the new state indication message.

16. The network element of claim 15, wherein the new state indication message comprises a port status indication message to indicate a status of a port of the line card.

17. The network element of claim 15, wherein the congestion handling initiation module comprises a counter to count a number of state indication messages in the queue.

18. The method of claim 1, wherein assimilating the contents of the older messages into the new message comprises combining quantitative relative variation information of the older messages with quantitative relative variation information of the new message.

* * * * *

UNITED STATES PATENT AND TRADEMARK OFFICE
CERTIFICATE OF CORRECTION

| | | |
|---|---|---|
| PATENT NO. | : 8,824,296 B2 | Page 1 of 1 |
| APPLICATION NO. | : 13/411431 | |
| DATED | : September 2, 2014 | |
| INVENTOR(S) | : Ungureanu | |

It is certified that error appears in the above-identified patent and that said Letters Patent is hereby corrected as shown below:

Title Page, Item (56), under "OTHER PUBLICATIONS", in Column 1, Line 1, delete "Telefonakiebolaget" and insert -- Telefonaktiebolaget --, therefor.

In the Specification

In Column 3, Line 42, delete "DESCRIPTION" and insert -- DETAILED DESCRIPTION --, therefor.

In Column 4, Line 25, delete "hander" and insert -- handler --, therefor.

In Column 11, Line 9, delete "(VOW)" and insert -- (VOIP) --, therefor.

In Column 12, Line 18, delete "module 710." and insert -- module 712. --, therefor.

Signed and Sealed this
Twenty-sixth Day of May, 2015

Michelle K. Lee
*Director of the United States Patent and Trademark Office*